Oct. 17, 1939.  J. C. JEFFRIES  2,176,424
FISHING REEL
Filed Oct. 23, 1937   2 Sheets-Sheet 1

John C. Jeffries,
INVENTOR.
BY CA Snow & Co.
ATTORNEYS.

Oct. 17, 1939.   J. C. JEFFRIES   2,176,424
FISHING REEL
Filed Oct. 23, 1937   2 Sheets-Sheet 2
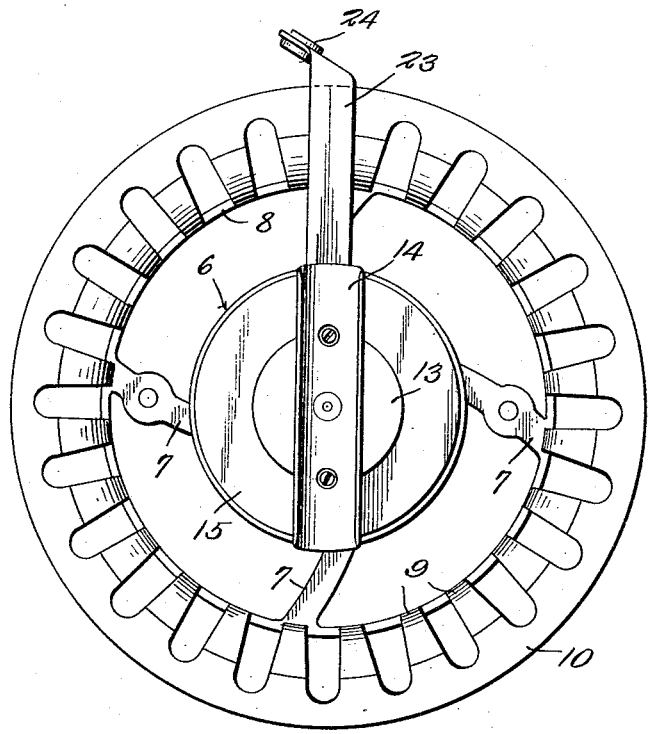
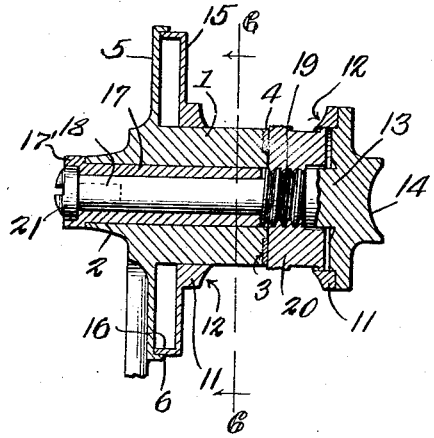
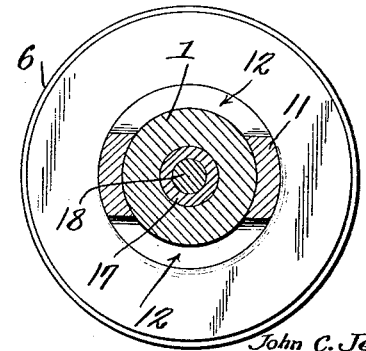
John C. Jeffries,
INVENTOR.
BY *C. A. Snow & Co.*
ATTORNEYS.

Patented Oct. 17, 1939

2,176,424

UNITED STATES PATENT OFFICE 2,176,424

FISHING REEL

John C. Jeffries, Angola, Ind.

Application October 23, 1937, Serial No. 170,692

1 Claim. (Cl. 242—84.5)

This invention relates to fishing reels and its primary object is to provide a light, durable and efficient device of this character having simple means under the control of the thumb whereby the reel can be locked against rotation, as when not in use, or can be retarded while rotating, the said locking and retarding means being so constructed that when a fish strikes the bait, the reel will be automatically unlocked so as to rotate freely to pay out the line.

A still further object is to so construct the reel as to be able to carry more line than ordinarily, there being a central support for the reel for the purpose of strengthening it.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawings the preferred form of the invention has been shown.

In said drawings—

Figure 3 is an elevation of that side of the reel opposite to the one shown in Figure 1.

Figure 5 is an enlarged section through the hub portion of the reel and showing the combined lock and retarding means.

Figure 6 is a section on line 6—6, Figure 5.

Figure 1:
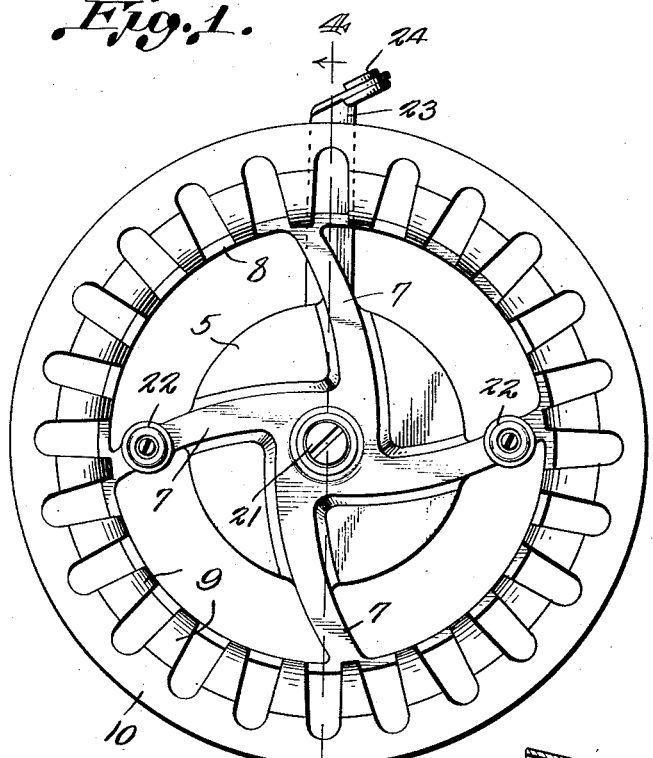
Figure 1 is an elevation showing one side of the reel.
Figure 2:
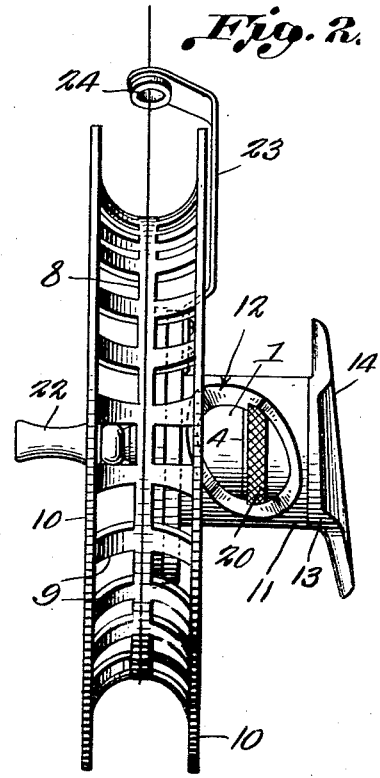
Figure 2 is an elevation of the reel as viewed at right angles to Figure 1.
Figure 4:
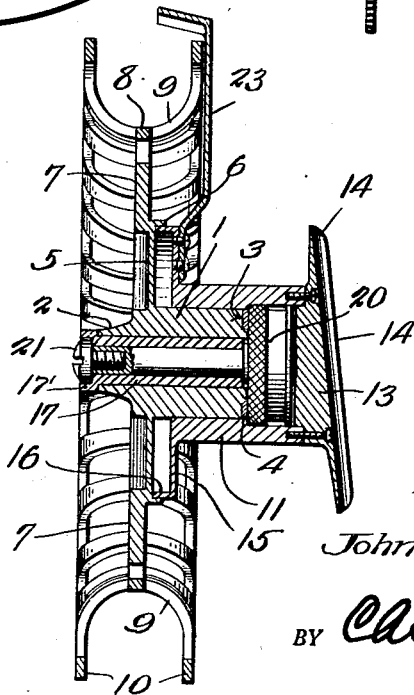
Figure 4 is a section on line 4—4, Figure 1.

Referring to the figures by characters of reference 1 designates a substantially cylindrical hub one end of which can be tapered as shown at 2 while the other end can be formed with an annular groove 3 in which is seated a friction ring 4 of any desired material. An annular flange 5 is made integral with the hub and has a circular bead 6 on one face concentric with the hub. Regularly spaced arms 7 are made integral with the flange 5 and are formed integral with a ring 8 which constitutes the central portion of the rim of the reel. In addition to this ring 8, the rim includes regularly spaced U-shaped yokes 9 connected at their outer ends by marginal rings 10 so that the reel thus is provided with a deep rim capable of holding much more line than other reels and which rim is rigidly supported by the central ring 8 made integral therewith and carried by the arms 7. The open construction of the reel renders it very light as well as durable.

The hub 1 is mounted for rotation in a sleeve 11 opposed portions of which are cut away to provide extensive openings 12, and one end of this sleeve is bolted or otherwise attached to a block 13 having a grooved base 14 adapted to straddle and to be fastened to the fishing rod, not shown.

That end of the sleeve 11 remote from the block 13 has an integral disk 15 provided at its margin with a circular flange 16 adapted to bear against flange 5 within the area surrounded by rib 6 so that a tight connection is thus provided without interfering with the rotation of the reel relative to sleeve 11.

A tubular bushing 17 having a head 17' at one end is located within the hub 11 and is mounted on a spindle 18 which projects from the block 13, it being preferably made an integral part of the block. That portion of the spindle nearest the block is enlarged and formed with a coarse screw-thread 19, this threaded portion being engaged by a knurled nut 20 which is exposed within the openings 12. The length of the nut is somewhat less than the distance between hub 11 and block 13 so that it is thus possible to feed the nut toward or from the hub 11.

The tubular bushing 17 is interposed between the threaded portion 19 of the spindle and a retaining screw 21 extending into said spindle.

Operating spindles 22 can be extended from one or more of the arms 7 and a line guide consisting of an arm 23 and an eye 24 can be provided, one end of the arm being fixedly secured to the disk 15 while the other end carrying the eye 24, overlies the peripheral channel formed in the reel.

When the nut 20 is rotated in one direction by pressure from the thumb of the user of the reel, it will be fed along the threaded portion 19 so as to move away from the friction ring or washer 4. Therefore the hub 1 of the reel can rotate freely on the bushing 17 between nut 20 and head 17' of the bushing, thereby to permit casting. The nut can then be rotated in the opposite direction to hold the reel, this action being due to the fact that the nut will thus be fed against the friction ring 4 so as to bind it against the hub 1 which is held against sliding movement by head 17'. This holding action is effected by turning the nut in a direction opposite to that in which the wheel rotated during the casting operation. When a fish strikes the bait, however, thereby pulling on the line, this line will pull on the reel, causing the hub 1 and friction ring 4 to rotate in such a direction as to turn the nut 20 away from binding position and slightly toward the block 3. Thus the reel will be unlocked automatically and can continue to rotate until the user presses with the thumb upon the nut so as to cause it again to bind against the ring 4 and set up a friction sufficient to retard the rotation of the reel.

When the reel is not in use this nut can be turned tightly against the friction ring for the purpose of locking it against rotation, thereby preventing the line from unwinding.

The entire device can be made of stainless steel or other metal which will not rust or corrode.

What is claimed is:

A fishing reel including a line-engaging rim having a hub, an attaching block, an apertured sleeve fixed relative to the block, said hub being mounted for rotation in the sleeve, a spindle fixed relative to the block and extending therefrom, a bushing on the spindle providing a bearing for the hub, a screw-thread on the spindle between the bushing and the block, a nut rotatable in the sleeve and operable through the aperture in said sleeve, said nut engaging the threaded portion of the spindle, and a friction ring interposed between the nut and one end of the hub, said nut being rotatable in one direction on the threaded portion of the spindle to exert a pressure through the friction ring against the hub, thereby to retard or stop the rotation of the hub, and said hub, when rotated in the opposite direction by the pull of a line thereon, constituting means for transmitting motion through the friction ring to the nut to rotate the nut in the opposite direction and release the hub for free rotation.

JOHN C. JEFFRIES.